(12) United States Patent
Chang et al.

(10) Patent No.: US 11,989,062 B2
(45) Date of Patent: May 21, 2024

(54) DISPLAY DEVICE AND MOBILE TERMINAL

(71) Applicants: KUNSHAN NEW FLAT PANEL DISPLAY TECHNOLOGY CENTER CO., LTD., Jiangsu (CN); KUNSHAN GO-VISIONOX OPTO-ELECTRONICS CO., LTD., Jiangsu (CN)

(72) Inventors: Chia-Huan Chang, Kunshan (CN); Linlin Li, Kunshan (CN)

(73) Assignees: KUNSHAN NEW FLAT PANEL DISPLAY TECHNOLOGY CENTER CO., LTD., Kunshan (CN); KUNSHAN GO-VISIONOX OPTO-ELECTRONICS CO., LTD., Kunshan (CN)

(*) Notice: Subject to any disclaimer, the term of this patent is extended or adjusted under 35 U.S.C. 154(b) by 217 days.

(21) Appl. No.: 17/687,102

(22) Filed: Mar. 4, 2022

(65) Prior Publication Data

US 2022/0276674 A1    Sep. 1, 2022

Related U.S. Application Data

(63) Continuation of application No. PCT/CN2021/073924, filed on Jan. 27, 2021.

(30) Foreign Application Priority Data

Mar. 6, 2020    (CN) .......................... 202010149578.9

(51) Int. Cl.
G06F 1/16    (2006.01)
H04M 1/02    (2006.01)

(52) U.S. Cl.
CPC ........ G06F 1/1652 (2013.01); H04M 1/0268 (2013.01); *G06F 1/1616* (2013.01); *G06F 1/1624* (2013.01); *H04M 1/0216* (2013.01)

(58) Field of Classification Search
CPC . H04M 1/0268; H04M 1/0216; G06F 1/1652; G06F 1/1616; G06F 1/1624
See application file for complete search history.

(56) References Cited

U.S. PATENT DOCUMENTS

| 8,971,032 | B2* | 3/2015 | Griffin ................. G06F 1/1616 |
| | | | 361/679.01 |
| 9,857,832 | B2* | 1/2018 | Kim .................... H04M 1/0268 |

(Continued)

FOREIGN PATENT DOCUMENTS

| CN | 105491193 A | 4/2016 |
| CN | 105549689 A | 5/2016 |

(Continued)

OTHER PUBLICATIONS

International Search Report and Written Opinion of the International Searching Authority mailed on Apr. 13, 2021, in corresponding to International Application No. PCT/CN2021/073924; 12 pages (with English Translation).

(Continued)

*Primary Examiner* — Nidhi Thaker
(74) *Attorney, Agent, or Firm* — Maier & Maier, PLLC (57) ABSTRACT

A display device including: a flexible display panel including two fixing portions and a bendable portion between the fixing portions; a supporting component including two supporting portions arranged on surfaces of the fixing portions to support the flexible display panel along a X direction; at least one rotating shaft located between the supporting portions and arranged to correspond to the bendable portion; at least one sliding component including a first sliding member and a second sliding member that are slidably connected in the X direction, the first sliding member is connected to one supporting portion, the second sliding member is rotatably connected to the rotating shaft; at least one driving component including a first magnetic member (Continued)

and a second magnetic member, a magnetic force between the first and second magnetic members drive the first sliding member to move away from the rotating shaft.

19 Claims, 4 Drawing Sheets

(56) References Cited

U.S. PATENT DOCUMENTS

| | | | |
|---|---|---|---|
| 10,880,417 B1* | 12/2020 | Song | H04M 1/0268 |
| 10,955,876 B1* | 3/2021 | Song | G06F 1/1652 |
| 11,119,534 B2* | 9/2021 | Lee | G06F 1/1616 |
| 2013/0342090 A1 | 12/2013 | Ahn et al. | |
| 2016/0378203 A1* | 12/2016 | Kim | H04M 1/022 345/156 |
| 2018/0150102 A1* | 5/2018 | Lee | G06F 1/1652 |
| 2018/0324964 A1* | 11/2018 | Yoo | F16C 29/02 |
| 2021/0165458 A1* | 6/2021 | Lee | G06F 1/1652 |
| 2022/0124925 A1* | 4/2022 | Xie | G06F 1/1641 |

FOREIGN PATENT DOCUMENTS

| | | | | |
|---|---|---|---|---|
| CN | 205584269 U | 9/2016 | | |
| CN | 207075032 U | 3/2018 | | |
| CN | 109671357 A | 4/2019 | | |
| CN | 208806014 U | 4/2019 | | |
| CN | 110166589 A | 8/2019 | | |
| CN | 110379313 A | * 10/2019 | | G09F 9/301 |
| CN | 110379313 A | 10/2019 | | |
| CN | 111343310 A | 6/2020 | | |

OTHER PUBLICATIONS

The First Office Action for Chinese Application No. 202010149578.9, dated Sep. 27, 2020, 18 pages (including machine-generated English translation).

Notification to Grant Patent Right for Invention for Chinese Application No. 202010149578.9, dated Mar. 30, 2021, 6 pages (including machine-generated English translation).

* cited by examiner

DISPLAY DEVICE AND MOBILE TERMINAL

CROSS-REFERENCE TO RELATED APPLICATIONS

This application is a continuation of International Application No. PCT/CN2021/073924, filed on Jan. 27, 2021, which claims priority to Chinese Patent Application No. 202010149578.9 filed on Mar. 6, 2020, all of which are hereby incorporated by reference in their entireties.

TECHNICAL FIELD

The present application relates to the technical field of display devices, and in particular to a display device and a mobile terminal.

BACKGROUND

With the upgrading of electronic products, in order to bring a better user experience, display screens of various electronic device terminals, such as mobile phones and tablet computers, have become larger and larger. However, with the increase of screens, sizes of the electronic devices will increase correspondingly, which will bring problems of inconvenience to carry and place.

A design of a foldable mobile phone meets needs of consumers for a large portable screen. Therefore, a flexible foldable screen is considered to be a development form of a future mobile phone. Flexible foldable screen technology finds a good compromise between a miniaturization development of electronic devices and a large-screen development of display screens. For example, a foldable screen mobile phone after being folded is the same size as a regular mobile phone, so it is easy to carry; while the screen is unfolded, a screen of a relative large display area may be obtained. In addition, a flexible screen can be bent freely to a large extent, so that a smart terminal device can get rid of an existing rigid structure, realize a diversified structure in form, and realize the folding and bending of a screen of the smart terminal device.

However, when a current foldable product changes from a folded state to a flat state, the foldable product screen in the flat state has a problem that there are slight wrinkles in appearance, which affects perception of customers and a product life.

SUMMARY

The present application provides a display device and a mobile terminal.

Embodiments of a first aspect of the present application provides a display device, including: a flexible display panel including two fixing portions and a bendable portion located between the two fixing portions; a supporting component including two supporting portions, wherein the two supporting portions are arranged on surfaces of the two fixing portions respectively to support the flexible display panel along a X direction; at least one rotating shaft located between the two supporting portions and arranged to correspond to the bendable portion; at least one sliding component including a first sliding member and a second sliding member that are slidably connected in the X direction, wherein the first sliding member is connected to one of the supporting portions, and the second sliding member is rotatably connected to the rotating shaft; at least one driving component including a first magnetic member and a second magnetic member, wherein a magnetic force between the first magnetic member and the second magnetic member provides a driving force for the first sliding member to move along a direction away from the at least one rotating shaft.

Embodiments of a second aspect of the present application also provides a mobile terminal including the above-mentioned display device.

In the display device of the embodiments of the present application, the display device includes the flexible display panel, the supporting component, the sliding component, and the driving component. The flexible display panel can realize a transition of the display device between a folded state and a flat state through its bendable portion, the supporting portions of the support component can provide good support to the fixing portions of the flexible display panel, and the rotating shaft can ensure the bendable portion to achieve normal bending. The first sliding member and the second sliding member in the sliding component are slidably arranged with each other, so that when the display device is bent, the first sliding member can drive a supporting portion to move relative to the rotating shaft. The first magnetic member and the second magnetic member in the driving component can generate a magnetic force, which drives the first sliding member to move in a direction away from the rotating shaft, so that the first sliding member can drive the supporting portion away from the rotating shaft, and in turn drive a fixing portion away from the rotating shaft, which can make the fixing portion as far away from the bendable portion as possible, so as to stretch the bendable portion to the flat state. Therefore, the display device of the embodiments of the present application can solve the problem that there are wrinkles in a foldable product in the flat state in the prior art, so that the foldable product has a good look and feel, and an influence of wrinkles on a service life of a flexible screen can be avoided, and a service life of the flexible display panel can be improved.

DETAILED DESCRIPTION

In order to better understand the present application, a display device and a mobile terminal of the embodiments of the present application will be described in detail below in conjunction with FIG. 1 to FIG. 5.

Figure 1:
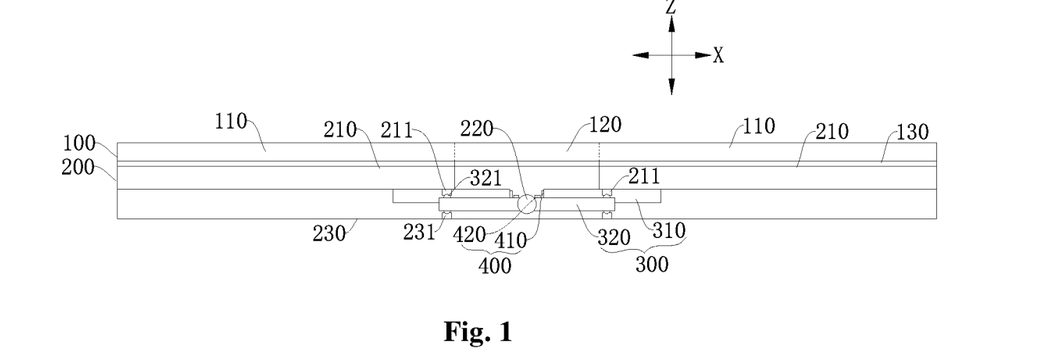
FIG. 1 is a schematic structural diagram of a display device in a flat state according to an embodiment of the present application.
Figure 2:
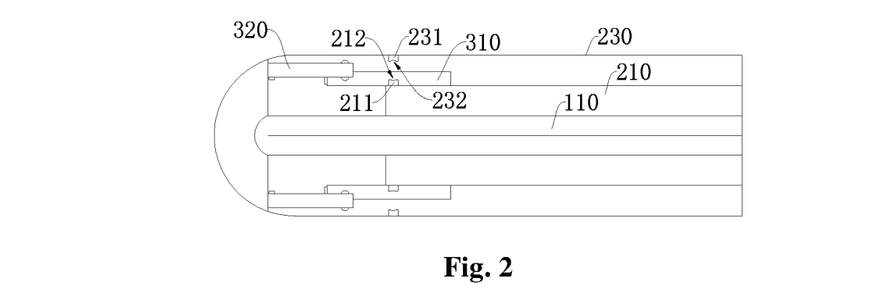
FIG. 2 is a schematic structural diagram of a display device in a folded state according to an embodiment of the present application.
Figure 3:
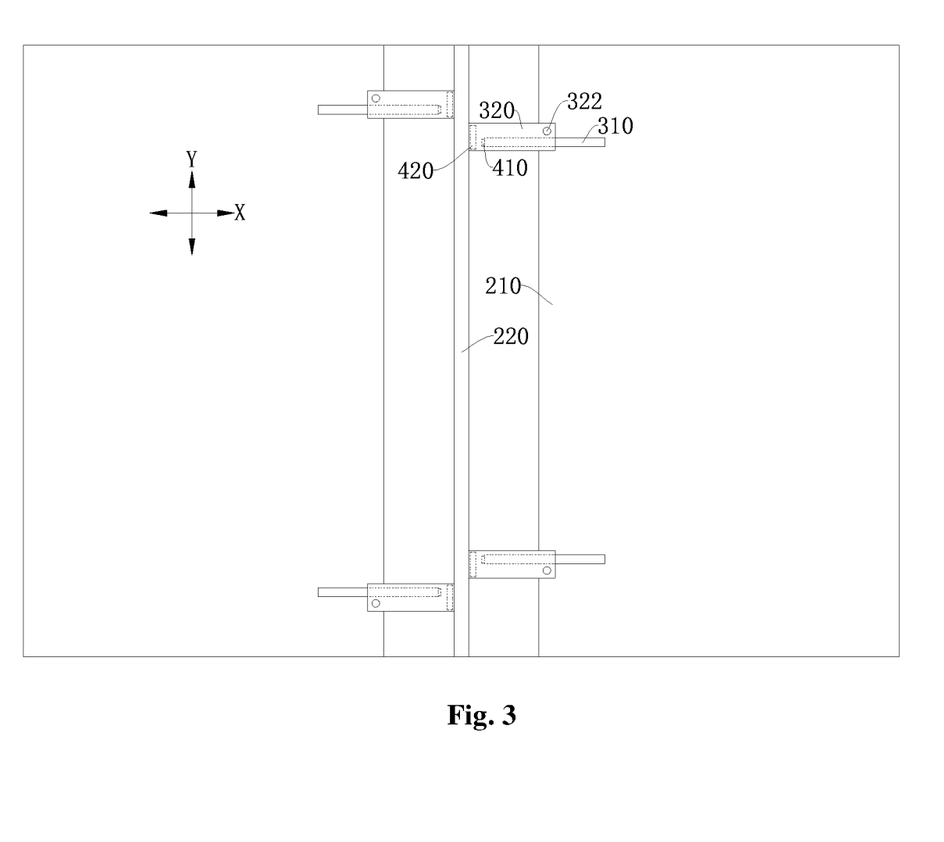
FIG. 3 is a schematic plan view of a display device in a flat state according to an embodiment of the present application.

Please refer to FIGS. 1 to 3 together, the display device of the embodiments of the present application includes: a flexible display panel 100 including two adjacent fixing portions 110 and a bendable portion 120 located between the two adjacent fixing portions 110; a supporting component 200 including two supporting portions 210, wherein the two supporting portions 210 are arranged on surfaces of the two fixing portions 110 respectively to support the flexible display panel 100; at least one rotating shaft 220 located between the two supporting portions 210 and arranged to correspond to the bendable foldable portion 120; at least one sliding component 300 including a first sliding member 310 and a second sliding member 320 that are slidably connected in a direction perpendicular to the rotating shaft 220 (i.e., X direction in FIG. 1), wherein the first sliding member 310 is connected to one of the supporting portions 210, and the second sliding member 320 is rotatably connected to the rotating shaft 220; at least one driving component 400 including a first magnetic member 410 and a second magnetic member 420, wherein a magnetic force between the first magnetic member 410 and the second magnetic member 420 provides a driving force for the first sliding member 310 to move in a direction away from the rotating shaft 220.

According to the embodiments of the present application, there is no restriction on a specific type of the display device. Examples of the display device may include, but not limited to, a display screen of a foldable mobile phone, or a display screen of a foldable tablet computer, and the like.

FIG. 1 shows a boundary between the fixing portions 110 and the bendable portion 120 with dotted lines. The dotted lines do not constitute a limitation on a structure of the flexible display panel 100, and the fixing portions 110 and the bendable portion 120 may be integrally arranged.

In the display device of the embodiments of the present application, the display device includes the flexible display panel 100, the supporting component 200, the sliding component 300, and the driving component 400. The flexible display panel 100 can realize a transition of the display device between a folded state and a flat state through its bendable portion 120, the supporting portions 210 of the support component 200 can provide good support to the fixing portions 110 of the flexible display panel 100, and the rotating shaft 220 can ensure the bendable portion 120 to achieve normal bending. The first sliding member 310 and the second sliding member 320 in the sliding component 300 are slidably arranged with each other, so that when the display device is bent, the first sliding member 310 can drive a supporting portion 210 to move relative to the rotating shaft 220. The first magnetic member 410 and the second magnetic member 420 in the driving component 400 can generate a magnetic force, which drives the first sliding member 310 to move in a direction away from the rotating shaft 220, so that the first sliding member 310 can drive the supporting portion 210 away from the rotating shaft 220, and in turn drive a fixing portion 110 away from the rotating shaft 220, which can make the fixing portion 110 as far away from the bendable portion 120 as possible, thereby stretching the bendable portion 120 to the flat state. Therefore, the display device of the embodiments of the present application can solve the problem that there are wrinkles in a foldable product in the flat state in the prior art, so that the foldable product has a good look and feel, and an influence of wrinkles on a service life of a flexible screen can be avoided, and a service life of the flexible display panel 100 can be improved.

In some optional embodiments, a protective layer 130 is arranged between the flexible display panel 100 and the supporting component 200, and the supporting portions 210 are connected to the fixing portions 110 through the protective layer 130. This prevents damage to the fixing portions 110 when the supporting portions 210 drive the fixing portions 110 to move, and further improves the service life of the display device. The protective layer 130 may be, for example, a flexible metal plate or the like.

In some optional embodiments, the display device has the folded state and the flat state. In the flat state, the magnetic force between the first magnetic member 410 and the second magnetic member 420 provides the driving force for the first sliding member 310 to move in the direction away from the rotating shaft 220.

Under a condition that the display device is an inward-foldable display device, that is, the flexible display panel 100 is located inside the support component 200 in the folded state, a user cannot observe the flexible display panel 100 in the folded state, so the inward-foldable display device does not need the flexible display panel 100 to display in the folded state. However, under a condition that the inward-foldable display device is in the flat state, the bendable portion 120 is prone to problems such as dents. Under a condition that the display device of the embodiments of the present application is in the flat state, the magnetic force between the first magnetic member 410 and the second magnetic member 420 provides the driving force for the first sliding member 310 to move in the direction away from the rotating shaft 220. Therefore, in the flat state, the first sliding member 310 can drive the supporting portion 210 and the fixing portion 110 to move along the direction away from the rotating shaft 220, thereby improving a flatness of the bendable portion 120.

Figure 4:
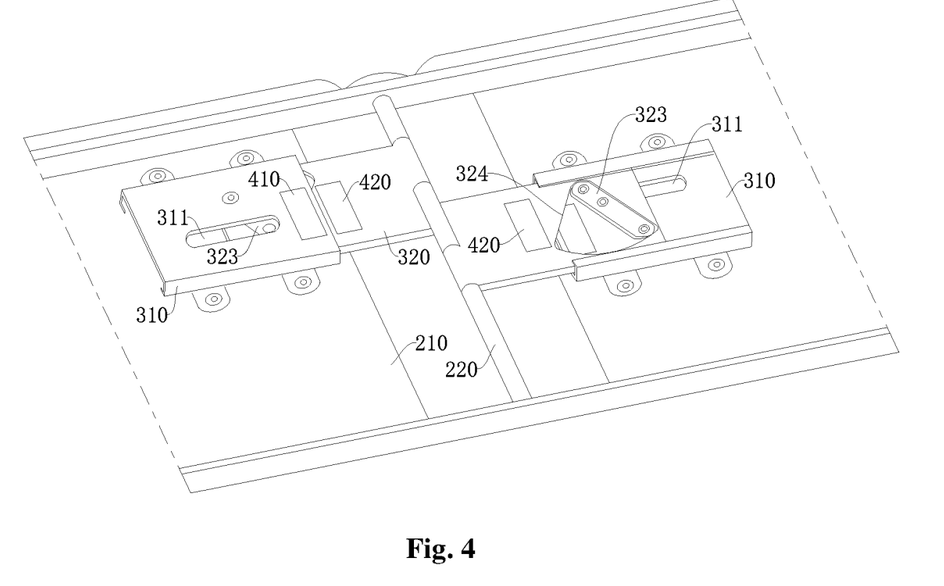
FIG. 4 is a schematic structural diagram of a display device in a flat state according to another embodiment of the present application.
Figure 5:
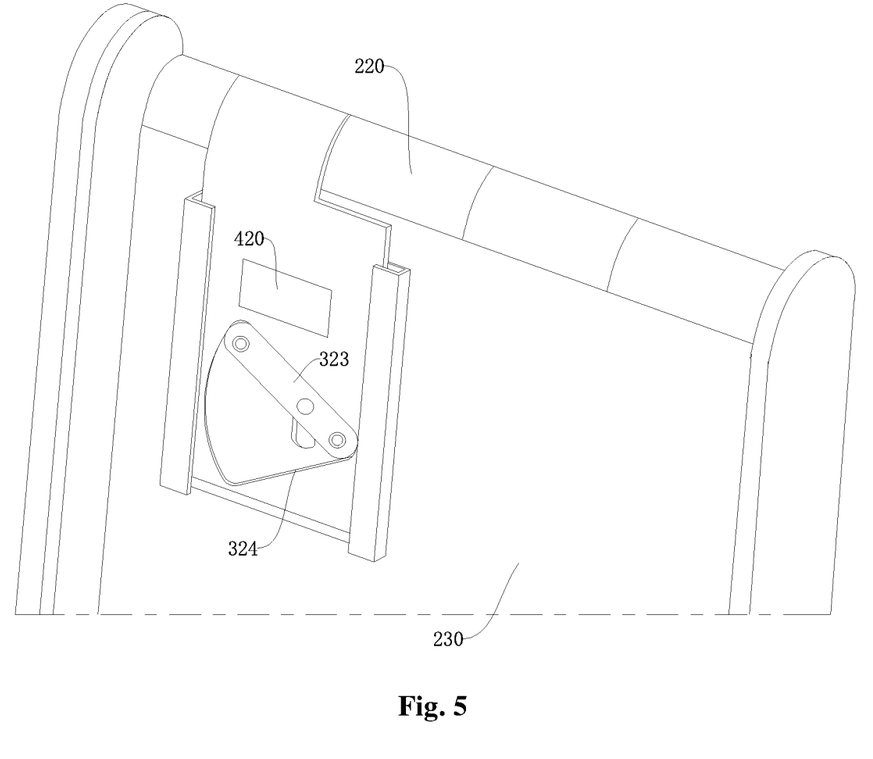
FIG. 5 is a schematic structural diagram of a display device in a folded state according to another embodiment of the present application.

As shown in FIGS. 4 and 5, the display device shown in FIGS. 4 and 5 is an outward-foldable display device. In FIG. 5, in order to better show an internal structure of the display device, structures outside the support component 200 such as the flexible display panel 100 and the protective layer 130, etc., are removed. Under a condition that the display device is an outward-foldable display device, that is, the flexible display panel 100 is located outside the support component 200 in the folded state, a user can still observe the flexible display panel 100 in the folded state. Under a condition that the outward-foldable display device is in the folded state, the flexible display panel 100 is in a stretched state, and problems of wrinkles are unlikely to occur. However, under a condition that the outward-foldable display device is in the flat state, the bendable portion 120 is prone to problems such as bulging. Under a condition that the display device of the embodiments of the present application is in the flat state, the magnetic force between the first magnetic member 410 and the second magnetic member 420 provides the driving force for the first sliding member 310 to move in the direction away from the rotating shaft 220. Therefore, in the flat state, the first sliding member 310 can drive the supporting portion 210 and the fixing portion 110 to move along the direction away from the rotating shaft 220, thereby improving the flatness of the bendable portion 120.

There are many ways to set the magnetic force between the first magnetic member 410 and the second magnetic member 420. For example, a magnetic attraction force generated between the first magnetic member 410 and the second magnetic member 420 may be used as the aforementioned driving force. At this time, magnetic properties of the first magnetic member 410 and the second magnetic member 420 are different, and in the flat state, a distance between the first magnetic member 410 and the second magnetic member 420 is within a preset distance, so that the magnetic attraction force between the first magnetic member 410 and the second magnetic member 420 can provide the driving force for the first sliding member 310 to move along the direction away from the rotating shaft 220.

There are many specific values for the preset distance. A user may set based on a magnetic field strength of the first magnetic member 410 and the second magnetic member 420 or a size of a space reserved in the display device, as long as the magnetic attraction force generated between the first magnetic member 410 and the second magnetic member 420 can drive the first sliding member 310 to move along the direction away from the rotating shaft 220, under a condition that the distance between the magnetic member 410 and the second magnetic member 420 is within the preset distance. For example, the preset distance is 2 mm~6 mm, etc.

When magnetic properties of the first magnetic member 410 and the second magnetic member 420 are different, in the flat state, the second magnetic member 420 is located on a side of the first magnetic member 410 away from the rotating shaft 220, so that the magnetic attraction force between the first magnetic member 410 and the second magnetic member 420 can drive the first magnetic member 410 to move along the direction away from the rotating shaft 220, thereby improving the flatness of the bendable portion 120.

Alternatively, in other optional embodiments, a magnetic repulsion force generated between the first magnetic member 410 and the second magnetic member 420 may be used as the aforementioned driving force. At this time, the magnetic properties of the first magnetic member 410 and the second magnetic member 420 are the same, and in the flat state, the distance between the first magnetic member 410 and the second magnetic member 420 is less than or equal to a first distance threshold, so that the magnetic repulsion force between the first magnetic member 410 and the second magnetic member 420 can drive the first sliding member 310 to move along the direction away from the rotating shaft 220. And when the magnetic repulsion force between the first magnetic member 410 and the second magnetic member 420 is used as the driving force, since the magnetic properties of the first magnetic member 410 and the second magnetic member 420 are the same, even if multiple sliding components 300 and driving components 400 are arranged in the display device, magnetic forces between each driving component 400 will not interfere with each other, thereby ensuring normal and stable operation of the driving component 400.

There are many specific values for the first distance threshold. The first distance threshold may be set based on parameters such as the magnetic field strength of the first magnetic member 410 and the second magnetic member 420 and the size of the space reserved in the display device, etc., as long as the magnetic repulsion force between the first magnetic member 410 and the second magnetic member 420 is sufficient to drive the first sliding member 310 to move along the direction away from the rotating shaft 220, under a condition that the distance between the first magnetic member 410 and the second magnetic member 420 is less than or equal to the first distance threshold. For example, the first threshold is 50 µm to 3 mm, etc.

When the magnetic properties of the first magnetic member 410 and the second magnetic member 320 are the same, in the flat state, the second magnetic member 420 is located on a side of the first magnetic member 410 facing the rotating shaft 220, so that the magnetic repulsion force between the second magnetic member 420 and the first magnetic member 410 can drive the first magnetic member 410 to move along the direction away from the rotating shaft 220, thereby improving the flatness of the bendable portion 120. For example, the second magnetic member 420 is located between the first magnetic member 410 and the rotating shaft 220; or the rotating shaft 220 is located between the second magnetic member 420 and the first magnetic member 410, that is, the second magnetic member 420 is located on a side of the rotating shaft 220 away from the first magnetic member 410.

The description will be given below by taking embodiments in which the magnetic properties of the first magnetic member 410 and the second magnetic member 420 are the same. FIGS. 1-3 illustrate an inward-foldable display device according to the embodiments of the present application, wherein in the folded state, the flexible display panel 100 is located inside the support component 200, and at this time, the first magnetic member 410 is located on a side of the first sliding member 310 facing the rotating shaft 220, and the second magnetic member 420 is located on a side of the second sliding member 320 close to the rotating shaft 220.

Under a condition that the inward-foldable display device is transformed from the folded state to the flat state, that is, under a condition that the display device is transformed from a state shown in FIG. 2 to a state shown in FIG. 1, the sliding member 310 moves along a direction close to the rotating shaft 220. Under a condition that the inward-foldable display device is in the flat state, a distance between the first sliding member 310 and the rotating shaft 220 is the shortest, and at this time, the distance between the first magnetic member 410 and the second magnetic member 420 is the shortest, and the distance between the first magnetic member 410 and the second magnetic member 420 is less than or equal to the first distance threshold, so that the magnetic repulsion force between the first magnetic member 410 and the second magnetic member 420 can drive the first sliding member 310 to move along the direction away from the rotating shaft 220, thereby improving the flatness of the bendable portion 120.

Under a condition that the inward-foldable display device is transformed from the flat state to the folded state, the first sliding member 310 moves along the direction away from the rotating shaft 220, and at the beginning of the transition from the flat state to the folded state, the repulsion force between the first magnetic member 410 and the second magnetic member 420 can drive the first sliding member 310 to move, so that it is easy to bend the inward-foldable display device from the flat state into the folded state. Under a condition that the inward-foldable display device is in the folded state, the distance between the first magnetic member 410 and the second magnetic member 420 is the farthest, and at this time, the distance between the first magnetic member 410 and the second magnetic member 420 is greater than the first distance threshold, and thus a force between the first magnetic member 410 and the second magnetic member 420 will not affect the operation of the sliding member 310, so as to prevent the flexible display panel 100 from being stretched in the folded state, thereby improving the service life of the flexible display panel 100.

In the above-mentioned embodiments, the first magnetic member 410 may be disposed on the first sliding member 310 and located on the side of the first sliding member 310 facing the rotating shaft 220, or the first magnetic member 410 may be disposed on the supporting portion 210 and located at the side of the first sliding member 310 facing the rotating shaft 220, or the first magnetic member 410 may be disposed on both the first sliding member 310 and the supporting portion 210, as long as the first magnetic member 410 is located on the side of the first sliding member 310 facing the rotating shaft 220. The second magnetic member 420 may be disposed on the second sliding member 320 and located on the side of the second sliding member 320 close to the rotating shaft 220, or the second magnetic member 420 may be disposed on the rotating shaft 220, or the second magnetic member 420 may be disposed on both the second sliding member 320 and the rotating shaft 220, as long as the second magnetic member 420 is located on the side of the second sliding member 320 close to the rotating shaft 220.

In another optional embodiment, there are two or more sliding components 300. Among the two or more sliding components 300, at least two sliding components 300 are symmetrically distributed with respect to the rotating shaft 220. At this time, the first magnetic member 410 and the second magnetic member 420 can be separately arranged on first sliding members 310 of the two sliding components 300. Under a condition that the inward-foldable display device is transformed from the folded state to the flat state, that is, under a condition that the display device is transformed from a state shown in FIG. 2 to a state shown in FIG. 1, two first sliding members 310 symmetrically distributed relative to the rotating shaft 220 move in the direction close to the rotating shaft 220, that is, the two first sliding members 310 symmetrically distributed relative to the rotating shaft 220 move in a direction close to each other. Under a condition that the inward-foldable display device is in the flat state, a distance between the two first sliding members 310 is the shortest, and at this time, the distance between the first magnetic member 410 and the second magnetic member 420 is the shortest, and the distance between the first magnetic member 410 and the second magnetic member 420 is less than or equal to the first distance threshold, so that the magnetic repulsion force between the first magnetic member 410 and the second magnetic member 420 can drive the first sliding member 310 to move along the direction away from the rotating shaft 220, thereby improving the flatness of the bendable portion 120.

FIGS. 4 and 5 illustrates an outward-foldable display device, wherein in the folded state, the flexible display panel 100 is located outside the support component 200, and at this time, the first magnetic member 410 is located on the side of the first sliding member 310 facing the rotating shaft 220, and the second magnetic member 420 is located on the second sliding member 320.

Under a condition that the outward-foldable display device is transformed from the folded state to the flat state, the first sliding member 310 moves along the direction away from the rotating shaft 220. Under a condition that the outward-foldable display device is in the flat state, the distance between the first sliding member 310 and the rotating shaft 220 is the farthest, and at this time, the distance between the first magnetic member 410 and the second magnetic member 420 is the farthest. At this time, the first magnetic member 410 is disposed on the side of the first sliding member 310 facing the rotating shaft 220, and the second magnetic member 420 is disposed on the second sliding member 320, so that the distance between the first magnetic member 410 and the second magnetic member 420 can be small enough and less than or equal to the first distance threshold, so that the magnetic repulsion force between the first magnetic member 410 and the second magnetic member 420 can drive the first sliding member 310 to continue to move along the direction away from the rotating shaft 220, thereby improving the flatness of the bendable portion 120.

In the above-mentioned embodiments, the first magnetic member 410 may be disposed on the first sliding member 310 and located on the side of the first sliding member 310 facing the rotating shaft 220, or the first magnetic member 410 may be disposed on the supporting portion 210 and located at the side of the first sliding member 310 facing the rotating shaft 220, or the first magnetic member 410 may be disposed on both the first sliding member 310 and the supporting portion 210, as long as the first magnetic member 410 is located on the side of the first sliding member 310 facing the rotating shaft 220.

Under a condition that the display device is transformed between the folded state and the flat state, there are many ways to drive the first sliding member 310 and the second sliding member 320 to move relative to each other. For example, there is an elastic structure connected between the first sliding member 310 and the rotating shaft 220, under a condition that the display device is transformed between the folded state and the flat state, the first sliding member 310 and the second sliding member 320 are moved relative to each other through an elastic deformation of the elastic structure. Alternatively, as shown in FIGS. 4 and 5, the first sliding member 310 is arranged with a sliding groove 311, the second sliding member 320 is arranged with a sliding rod 323 and a fan-shaped hole 324, the sliding rod 323 is arranged with a sliding block which is movable along the sliding groove 311, and the sliding rod 323 is rotatably arranged in the fan-shaped hole 324. Under a condition that the display device is transformed between the folded state and the flat state, the first sliding member 310 and the second sliding member 320 can slide relative to each other through an external force.

In some optional embodiments, a first supporting block 211 is arranged on a side of the supporting portion 210 away from the fixing portion 110, and the first supporting block 211 corresponds to a side of the fixing portion 110 close to the bendable portion 120. A first buckle block 321 is arranged on the second sliding member 320, and in the flat state, the first buckle block 321 and the first supporting block 211 are stacked in a thickness direction of the display device. That is, in the flat state, the first buckle block 321 and the first supporting block 211 are arranged to abut against and be in contact with each other in the thickness direction (Z direction in FIG. 1), so that the first buckle block 321 can provide to the first supporting block 211 a supporting force facing toward the flexible display panel 100.

Under a condition that the display device is transformed between the folded state and the flat state, a connection portion of the fixing portions 110 and the bendable portion 120 is prone to problems such as dents. In the display device of the embodiments of the present application, the first supporting block 211 is arranged on the side of the fixing portion 110 close to the bendable portion 120, and in the flat state, the first buckle block 321 on the second sliding member 320 and the first supporting block 211 are stacked, so the first buckle block 321 can provide support to the first supporting block 211, and in turn the first supporting block 211 can provide support to the fixing portion 110 through the supporting portion 210, thereby avoiding occurrence of problems such as dents of the fixing portions 110, which further ensures the flatness of the flexible display panel 100.

In some optional embodiments, the supporting component 200 further includes a supporting plate 230 arranged on a side of the supporting portion 210 and the rotating shaft 220 away from the flexible display panel 100, that is, the supporting portion 210, the rotating shaft 220, the sliding component 300, and the driving components 400 are all disposed between the flexible display panel 100 and the supporting plate 230.

A second supporting block 231 is arranged on the supporting plate 230, and the second supporting block 231 is separate from the first supporting block 211 along the thickness direction; a second buckle block 322 is further arranged on the second sliding member 320, and in the flat state, the second buckle block 322 and the second supporting block 231 are stacked in the thickness direction.

In these optional embodiments, by arranging the second supporting block 231 and the second buckle block 322, the first supporting block 211, the first buckle block 321, the second sliding member 320, the second buckle block 322 and the second supporting block 231 are stacked in sequence and support each other in the thickness direction, which can improve a supporting force of a position where the first supporting block 211 is located, thereby ensuring the flatness of the fixing portions 110.

There are many ways to connect the first buckle block 321 and/or the second buckle block 322 to the second sliding member 320. For example, the first buckle block 321 and/or the second buckle block 322 may be connected to the second sliding member 320 by means of bolts, bonding, riveting or welding. Alternatively, the first buckle block 321 and/or the second buckle block 322 and the second sliding member 320 are integrally formed.

There may also be multiple ways to connect the first supporting block 211 to the supporting portion 210. For example, the first supporting block 211 may be connected to a surface of the supporting portion 210 away from the flexible display panel 100 using a connection method such as riveting, bonding or welding, etc., or the first supporting block 211 and the supporting portion 210 are integrally formed.

In some optional embodiments, a first clamping groove 212 is formed in a surface of the first supporting block 211 facing the first buckle block 321, and in the flat state, the first buckle block 321 is affixed to the first clamping groove 212, which in turn ensures a stability of a relative position between the first supporting block 211 and the first buckle block 321.

In these optional embodiments, a distance between a top surface of the first supporting block 211 facing the first buckle block 321 and the second sliding member 320 is less than a height that the second buckle block 322 protrudes from the second sliding member 320. As such, when the first buckle block 321 moves into the first clamping groove 212, the first supporting block 211 is pushed to move first, so that the first supporting block 211 in turn drives the supporting portion 210 and the fixing portion 110 to move, thereby further ensuring the flatness of the flexible display panel 100. When the first buckle block 321 is located in the first clamping groove 212, it can provide a limiting force to the first supporting block 211, to prevent the first supporting block 211 from moving toward the rotating shaft 220, which ensures that the fixing portions 110 does not retract, and further improves the flatness of the display panel 100.

There are many ways to arrange the first clamping groove 212. For example, the first clamping groove 212 may also be arranged on a surface of the first buckle block 321 facing the first supporting block 211, and in the flat state, the first supporting block 211 is affixed to the first clamping groove 212, which in turn ensures the stability of the relative position between the first supporting block 211 and the first buckle block 321. As described above, there are many ways to arrange the first clamping groove 212, as long as a surface of one of the first supporting block 211 and the first buckle block 321 is arranged with a clamping groove, and in the flat state, the first supporting block 211 is affixed to the first buckle block 321 via the first clamping groove 212 to improve the stability of the relative position between the first supporting block 211 and the first buckle block 321.

In other optional embodiments, a second clamping groove 232 is formed in a surface of the second supporting block 231 facing the second buckle block 322, and in the flat state, the second buckle block 322 is affixed to the second clamping groove 232, which in turn ensures a stability of a relative position between the second supporting block 231 and the second buckle block 322.

There are many ways to arrange the second clamping groove 232. For example, the second clamping groove 232 may also be arranged on a surface of the second buckle block 322 facing the second supporting block 231, and in the flat state, the second supporting block 231 is affixed to the second clamping groove 232, which in turn ensures the stability of the relative position between the second supporting block 231 and the second buckle block 322. As described above, there are many ways to arrange the second clamping groove 232, as long as a surface of one of the second supporting block 231 and the second buckle block 322 is arranged with a clamping groove, and in the flat state, the second supporting block 231 is affixed to the second buckle block 322 via the second clamping groove 232 to improve the stability of the relative position between the second supporting block 231 and the second buckle block 322.

In any of the above embodiments, the number of sliding component 300 is not particularly limited. For example, one set of sliding components 300 may be arranged. Alternatively, as shown in FIG. 3, two or more sliding components 300 may be arranged, and the two or more sliding components 300 are separate from each other along an axial direction of the rotating shaft 220 (i.e., Y direction in FIG. 3). As such, the supporting portions 210 at different positions can be driven to move through a mutual sliding of the first sliding member 310 and the second sliding member 320 in the two or more sliding components 300, thereby ensuring the flatness of the flexible display panel 100 everywhere.

In other optional embodiments, the two or more sliding components 300 are arranged on both sides of the rotating shaft 220, so that the two supporting portions 210 on both sides of the rotating shaft 220 can be driven by the sliding component 300 along the direction away from the rotating shaft 220, which in turn causes the two fixing portions 110 to stretch in a direction away from each other, so as to improve the flatness of the bendable portion 120.

For example, the display device adopts a dual-axis type or a single-axis type. The dual-axis type means that, the support component 200 includes two rotating shafts 220, and the two rotating shafts 220 are arranged side by side in the X direction. At this time, the second sliding members 320 are respectively connected to the rotating shafts 220. The single-axis type means that, the supporting component 200 includes one rotating shaft 220, and at this time, second sliding members 320 arranged on both sides of the rotating shaft 220 are staggered along the Y direction, and the two or more second sliding members 320 are respectively connected to different positions of the rotating shaft 220.

The two or more sliding components 300 may be driven by one set of driving component 400. For example, the first magnetic member 410 and the second magnetic member 420 are both strip-shaped and extend along the axial direction of the rotating shaft 220, so that the first magnetic member 410 and the second magnetic member 420 can provide the driving force for second sliding members 320 of multiple sliding components 300. Alternatively, in other optional embodiments, there are two or more driving components 400, and each driving component 400 is arranged in a one-to-one correspondence with each sliding component

300, so that each driving component 400 drives the second sliding member 320 of the sliding component 300 to move, respectively.

On the other hand, the embodiments of the present application further provide a mobile terminal, including the above-mentioned display device. The mobile terminal is, for example, a foldable mobile phone, a foldable tablet, or a foldable learning machine. Since the mobile terminal of the embodiments of the present application includes the above-mentioned display device, the mobile terminal of the embodiments of the present application has beneficial effects of the above-mentioned display device, which will not be repeated herein.

What is claimed is:

1. A display device, comprising:
   a flexible display panel comprising two fixing portions adjacent to each other and a bendable portion located between the two fixing portions;
   a supporting component comprising two supporting portions, wherein the two supporting portions are arranged on surfaces of the two fixing portions respectively to support the flexible display panel along a X direction and a first supporting block is arranged on a side of a supporting portion away from a fixing portion;
   at least one rotating shaft located between the two supporting portions and arranged to correspond to the bendable portion;
   at least one sliding component comprising a first sliding member and a second sliding member slidably connected in the X direction, wherein the first sliding member is connected to one of the supporting portions, and the second sliding member is rotatably connected to the rotating shaft;
   at least one driving component comprising a first magnetic member and a second magnetic member, wherein a magnetic force between the first magnetic member and the second magnetic member provides a driving force for the first sliding member to move along a direction away from the at least one rotating shaft.

2. The display device of claim 1, wherein the display device has a folded state and a flat state, and in the flat state, the magnetic force between the first magnetic member and the second magnetic member provides the driving force for the first sliding member to move along the direction away from the at least one rotating shaft.

3. The display device of claim 2, wherein magnetic properties of the first magnetic member and the second magnetic member are the same, and in the flat state, a distance between the first magnetic member and the second magnetic member is less than or equal to a first distance threshold, and a magnetic repulsion force between the first magnetic member and the second magnetic member provides the driving force for the first sliding member to move along the direction away from the at least one rotating shaft.

4. The display device of claim 3, wherein in the flat state, the second magnetic member is located on a side of the first magnetic member facing the at least one rotating shaft.

5. The display device of claim 2, wherein magnetic properties of the first magnetic member and the second magnetic member are different, and in the flat state, a distance between the first magnetic member and the second magnetic member is within a preset distance, and a magnetic attraction force between the first magnetic member and the second magnetic member provides the driving force for the first sliding member to move along the direction away from the at least one rotating shaft.

6. The display device of claim 5, wherein in the flat state, the second magnetic member is located on a side of the first magnetic member away from the at least one rotating shaft.

7. The display device of claim 2, wherein the first supporting block corresponds to a side of the fixing portion close to the bendable portion.

8. The display device of claim 7, wherein a first buckle block is arranged on the second sliding member, and in the flat state, the first buckle block and the first supporting block are stacked in a thickness direction of the display device.

9. The display device of claim 8, wherein the supporting component further comprises a supporting plate arranged on a side of the supporting portion and the rotating shaft away from the flexible display panel, wherein a second supporting block is arranged on the supporting plate, and the second supporting block is separated from the first supporting block along the thickness direction.

10. The display device of claim 9, wherein a second buckle block is further arranged on the second sliding member, and in the flat state, the second buckle block and the second supporting block are stacked in the thickness direction.

11. The display device of claim 10, wherein:
    a first clamping groove is formed on a surface of one of the first supporting block and the first buckle block, and in the flat state, the first supporting block is affixed to the first buckle block via the first clamping groove.

12. The display device of claim 10, wherein a second clamping groove is formed in a surface of one of the second supporting block and the second buckle block, and in the flat state, the second supporting block is affixed to the second buckle block via the second clamping groove.

13. The display device of claim 1, wherein the at least one sliding component comprises two or more sliding components, wherein the two or more sliding components are separate from each other along a Y direction perpendicular to the X direction.

14. The display device of claim 13, wherein the two or more sliding components are arranged on both sides of the at least one rotating shaft.

15. The display device of claim 14, wherein the at least one rotating shaft comprises two rotating shafts, the two rotating shafts are arranged side by side in the X direction, and the second sliding members are respectively connected to the rotating shafts.

16. The display device of claim 14, wherein the at least one rotating shaft comprises only one rotating shaft, the second sliding members arranged on both sides of the rotating shaft are staggered along the Y direction, and the two or more second sliding members are respectively connected to different positions of the rotating shaft.

17. The display device of claim 13, wherein the at least one driving component comprises two or more driving components, each of the two or more driving component and each of the two or more sliding component are arranged in a one-to-one correspondence.

18. The display device of claim 1, wherein a protective layer is arranged between the flexible display panel and the supporting component, and the supporting portions are connected to the fixing portions via the protective layer.

19. A mobile terminal comprising the display device of claim 1.

* * * * *